US008934113B2

(12) United States Patent
Hosoda

(10) Patent No.: US 8,934,113 B2
(45) Date of Patent: Jan. 13, 2015

(54) IMAGE FORMING APPARATUS AND METHOD OF CONTROLLING SAME

(71) Applicant: Canon Kabushiki Kaisha, Tokyo (JP)

(72) Inventor: Yasuhiro Hosoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 13/770,893

(22) Filed: Feb. 19, 2013

(65) Prior Publication Data

US 2013/0222840 A1 Aug. 29, 2013

(30) Foreign Application Priority Data

Feb. 29, 2012 (JP) ................................ 2012-044306

(51) Int. Cl.

*G06F 15/00* (2006.01)
*H04N 1/00* (2006.01)
*H04N 1/44* (2006.01)

(52) U.S. Cl.

CPC ......... *H04N 1/0084* (2013.01); *H04N 1/00204* (2013.01); *H04N 1/4433* (2013.01); *H04N 2201/0039* (2013.01); *H04N 2201/0075* (2013.01); *H04N 2201/0094* (2013.01)

USPC ......................... 358/1.14; 358/1.15; 709/221

(58) Field of Classification Search

None

See application file for complete search history.

(56) References Cited

U.S. PATENT DOCUMENTS

| | | | | |
|---|---|---|---|---|
| 6,965,404 | B2 | 11/2005 | Hosoda et al. | |
| 7,106,461 | B2 | 9/2006 | Kakigi et al. | |
| 7,253,920 | B2 | 8/2007 | Hosoda | |
| 7,415,280 | B2 | 8/2008 | Taniguchi et al. | |
| 2002/0115451 | A1* | 8/2002 | Taniguchi et al. | 455/456 |
| 2009/0207434 | A1* | 8/2009 | Tanaka | 358/1.14 |
| 2010/0231950 | A1* | 9/2010 | Sawayanagi et al. | 358/1.14 |
| 2011/0058220 | A1* | 3/2011 | Moritomo | 358/1.15 |
| 2012/0117209 | A1* | 5/2012 | Sinha | 709/221 |

FOREIGN PATENT DOCUMENTS

JP 3925208 B2 6/2007

* cited by examiner

*Primary Examiner* — Kimberly A Williams
*Assistant Examiner* — Helen Q Zong
(74) *Attorney, Agent, or Firm* — Fitzpatrick, Cella, Harper & Scinto

(57) ABSTRACT

Local operation of an image forming apparatus is permitted from a tablet terminal only in a case where the tablet terminal is in the vicinity of the image forming apparatus. To achieve this, the position of the tablet terminal is determined by GPS. Alternatively, the position of a user holding a tablet terminal is determined using a local authentication unit of the image forming apparatus. Local operation is permitted if the user of the tablet terminal is within a predetermined range with respect to the image forming apparatus.

8 Claims, 12 Drawing Sheets

F I G. 3A
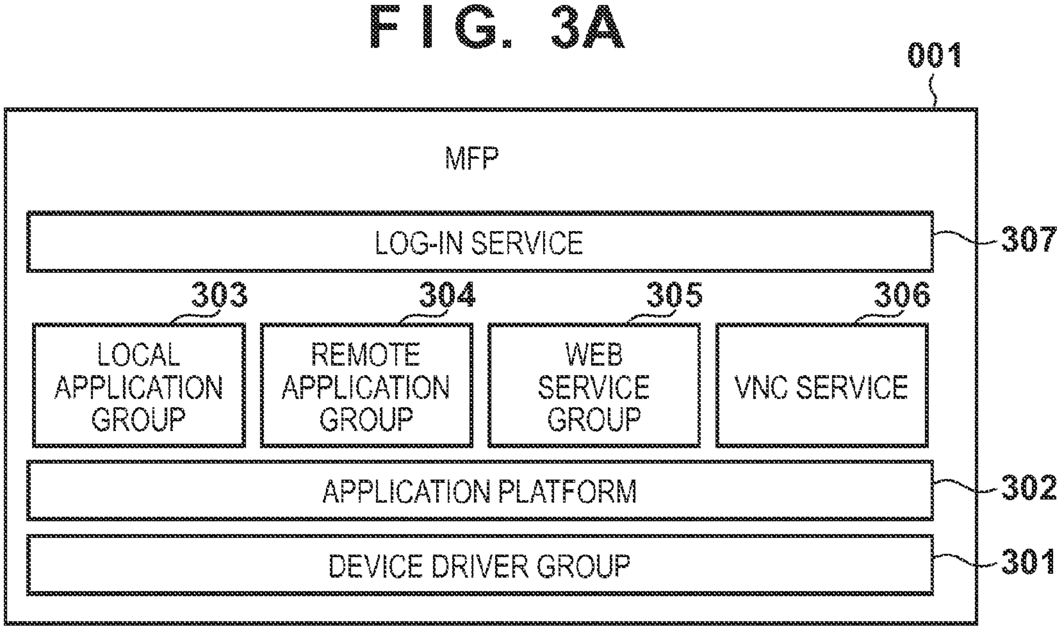
F I G. 3B
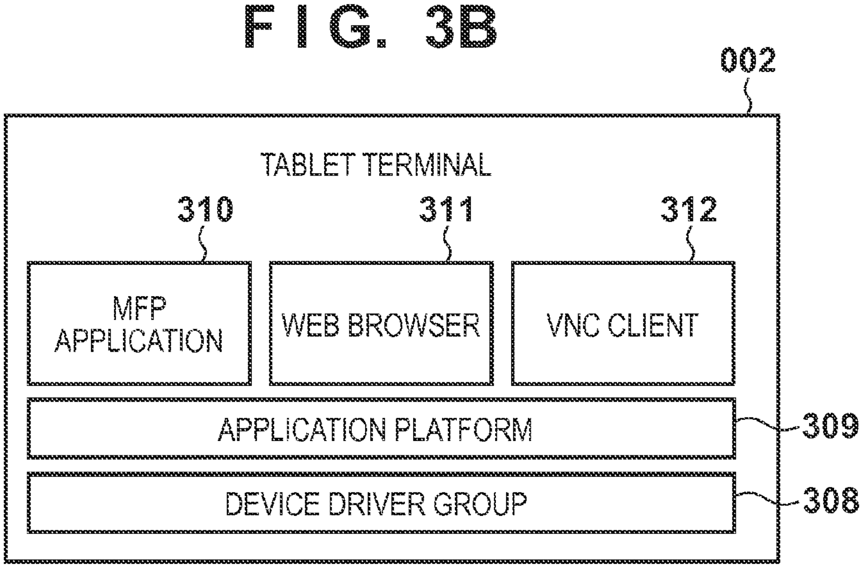

| ACCOUNT | PASSWORD | CARD ID |
|---|---|---|
| Alice | ***** | 3144358442320650001 |
| Bob | ***** | 3144358442320650002 |
| Carol | ***** | 3144358442320650003 |
| Dave | ***** | 3144358442320650004 |

| OPERATION PERMISSION LEVEL | FUNCTION PERMITTED FOR UTILIZATION | GPS POSITIONING CONDITIONS | | | |
|---|---|---|---|---|---|
| | | GPS POSITIONING ACCURACY | HORIZONTAL DISTANCE | HEIGHT | MEASUREMENT TIME |
| LEVEL 1 | LOCAL OPERATION<br>PRINT<br>STORE AND PRINT | WITHIN ERROR OF ±2 m | WITHIN ±2 m | WITHIN ±1 m | WITHIN ±10 SECONDS |
| LEVEL 2 | PRINT<br>STORE AND PRINT | WITHIN ERROR OF ±10 m | WITHIN ±20 m | WITHIN ±1 m | WITHIN ±30 SECONDS |
| LEVEL 3 | STORE AND PRINT | WITHIN ERROR OF ±20 m | WITHIN ±50 m | WITHIN ±1 m | WITHIN ±300 SECONDS |
| LEVEL 4 | NONE | UNKNOWN | | | |

| CLIENT ID | ADDRESS | LOG-IN ACCOUNT | DISTANCE | FUNCTION PERMISSION LEVEL | LOCAL-OPERATION RESERVATION STATUS |
|---|---|---|---|---|---|
| TABLET TERMINAL 002 | 172.24.12.56 | Alice | 2m | LEVEL 1 | |
| TABLET TERMINAL 003 | 172.24.12.57 | Bob | 2m | LEVEL 2 | RESERVATION RECEIVED |
| TABLET TERMINAL 004 | 172.24.12.58 | Carol | 10m | LEVEL 3 | |
| TABLET TERMINAL 005 | 172.24.12.59 | Dave | UNKNOWN | LEVEL 4 | |

| MFP | ADDRESS | ACCOUNT | PASSWORD |
|---|---|---|---|
| MFP001 | 172.24.12.34 | Alice | ***** |
| MFP002 | 172.24.12.35 | Alice | ***** |
| MFP003 | 172.24.12.36 | Alice | ***** |
| MFP004 | 172.24.12.37 | Alice | ***** |

F I G. 5A
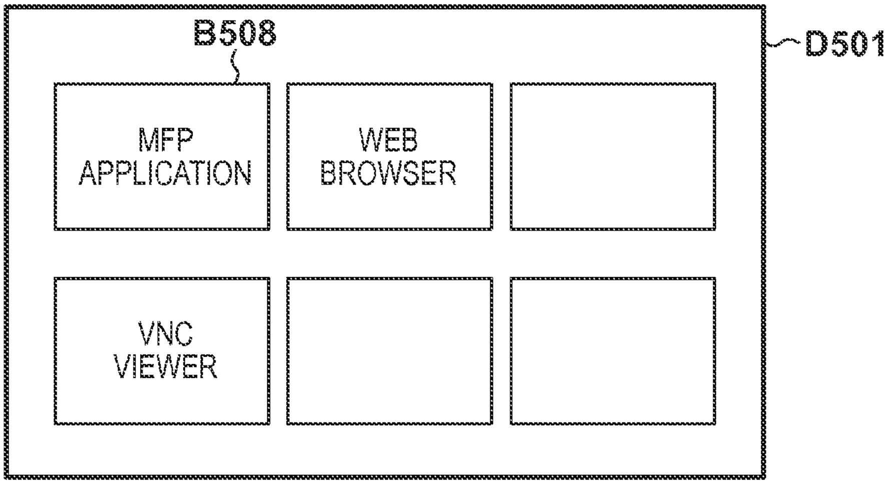
F I G. 5B
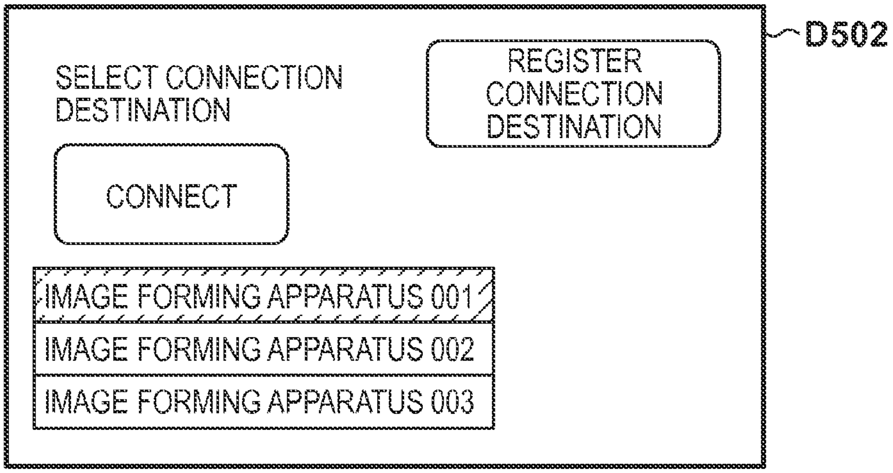
F I G. 5C
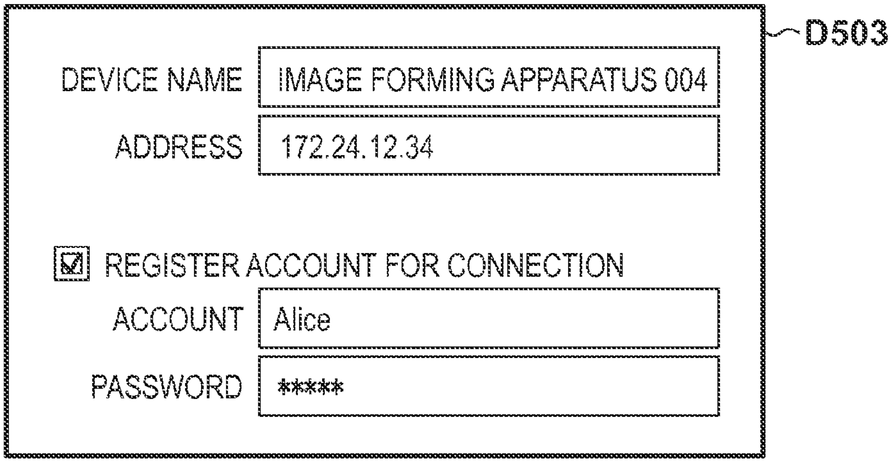

F I G. 5D
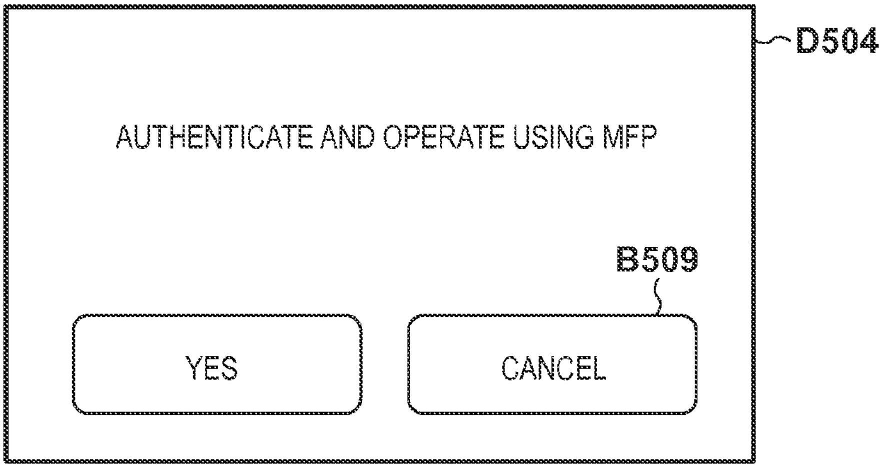
F I G. 5E
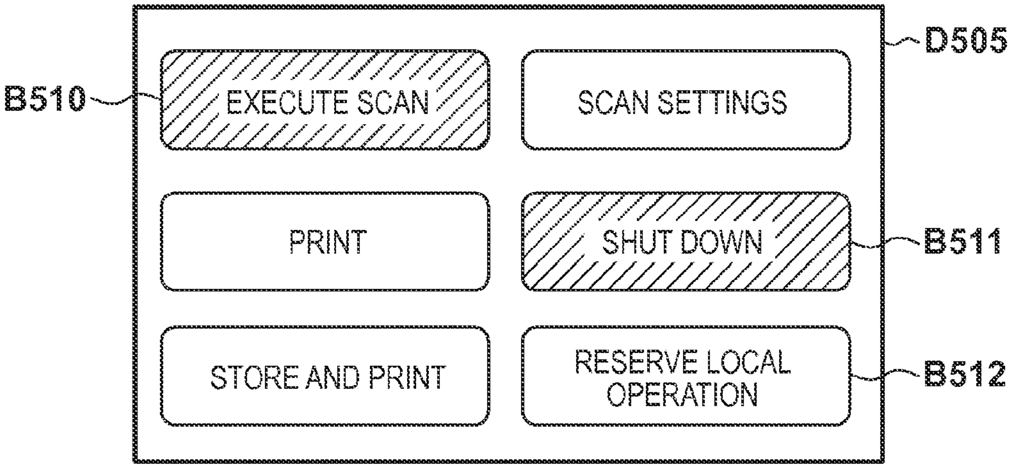
F I G. 5F
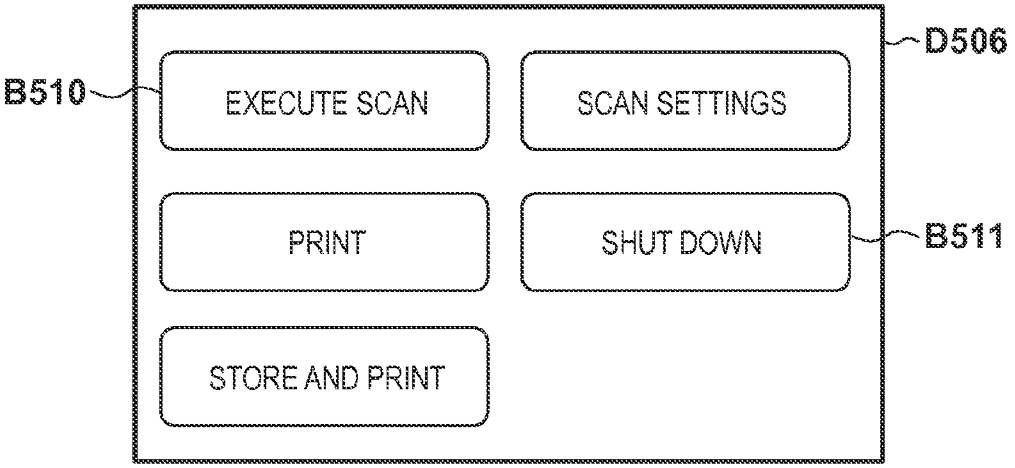

F I G. 6
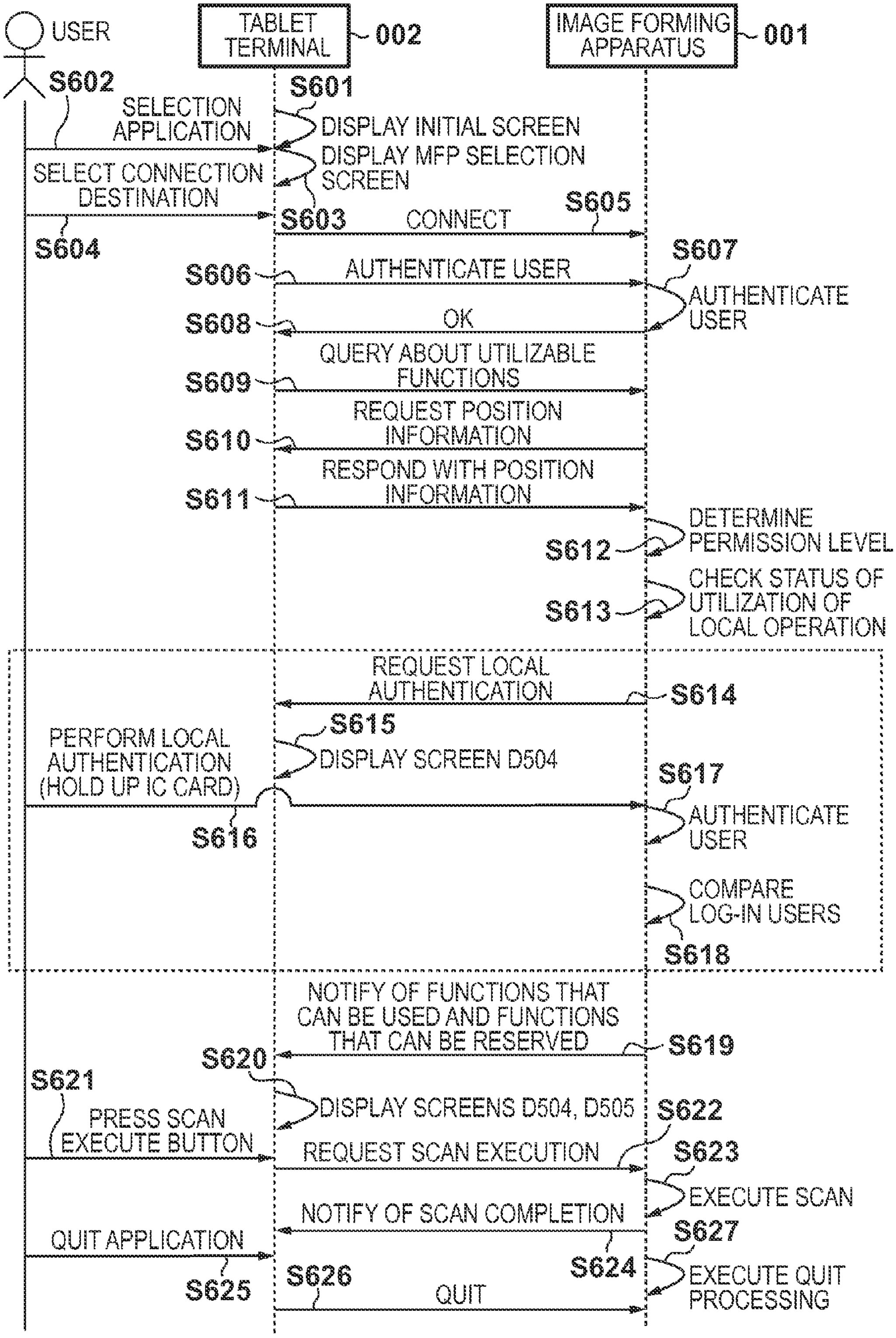

| CLIENT ID | PASSWORD |
|---|---|
| TABLET TERMINAL 002 | AAA1234 |
| TABLET TERMINAL 003 | BBB5678 |
| TABLET TERMINAL 004 | CCC4321 |
| TABLET TERMINAL 005 | DDD9876 |

F I G. 10A
F I G. 10B
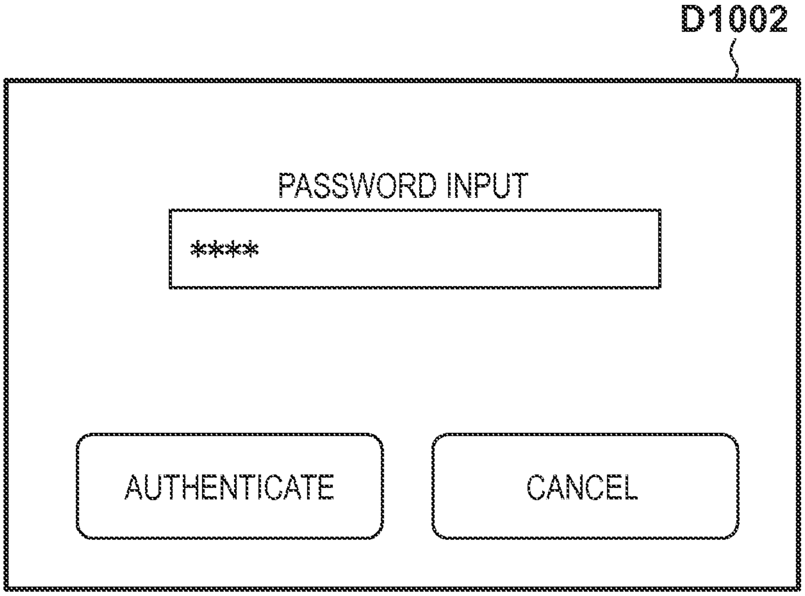

IMAGE FORMING APPARATUS AND METHOD OF CONTROLLING SAME

BACKGROUND OF THE INVENTION

1. Field of the Invention

The present invention relates to an image forming apparatus accessed, for example, from a portable terminal, and to a method of controlling this apparatus.

2. Description of the Related Art

Commercially available, general-purpose tablet terminals featuring outstanding user operability have become widespread, examples of which are terminals such as Apple Inc.'s iPad® and Google Inc.'s Android®. It is standard for these tablet terminals to be equipped with a wireless LAN and a GPS (Global Positioning System) sensor. Further, applications for tablet terminals that enable printing from a printer via a wireless LAN also exist. Such tablet terminals are utilized for office work as well.

An image forming apparatus such as an MFP (Multifunction Peripheral), which is installed in an office or the like, is equipped with a scanner device in addition to the printer function, and with various other functions such as a function for transmitting scanned documents and a function for storing scanned documents.

The specification of Japanese Patent No. 3925208 discloses a control apparatus for acquiring portable-terminal position information from a repeater of a public line and transmitting a print request from the portable terminal to an image forming apparatus only in a case where the distance between the portable terminal and image forming apparatus is short.

If it could be made possible for the various functions of an MFP to be utilized from a tablet terminal via a wireless LAN in a manner similar to that of the print function possessed by an MFP as mentioned above, this would be advantageous in that it would lead to a further improvement in MFP accessibility. However, problems arise when the various functions of an MFP installed in an office or public space are made freely accessible from an individually owned table terminal. For example, if operation of a scanner, which intrinsically is capable of being operated via the control panel of an MFP, is made possible from a remotely located tablet terminal, the problems set forth below arise.

If the scanner is operated from a remotely located tablet terminal, this will interfere with operation by a user who is attempting to utilize the scanner via the control panel of the MFP.

If a user has placed a document, which is to be read, in the scanner and subsequently operates the scanner from a remotely located tablet terminal, there is the possibility that the document used for scanning will be left in the scanner following execution of the scan.

In a case where operation of a scanner or the like is permitted from a tablet terminal, it is desired, in view of the above-mentioned problems, that such permission be granted upon positively verifying that the user operating the tablet terminal is in front of the MFP or in the vicinity thereof. However, with the method described in Japanese Patent No. 3925208 cited above, accurate distance as to whether the user carrying the tablet terminal is in front of the MFP or in the vicinity thereof cannot be ascertained. If a device for short-distance communication [an infrared or Bluetooth® device, for example) is utilized for communication between the MFP and the tablet, the above-mentioned problems can be eliminated since it is necessary for the user to be near the MFP. However, this give rise to another problem, namely the fact that both the MFP and the tablet device are required to have the device for short-distance communication.

SUMMARY OF THE INVENTION

The present invention has been devised in view of the above-mentioned problems and provides an image forming apparatus that permits use from a terminal such as a tablet terminal upon verifying the position of the terminal or the position of the user who owns the terminal without making use of short-distance communication.

According, the present invention provides an image forming apparatus having the structure set forth below.

An image forming apparatus capable of being connected to a portable terminal via a network, comprises: an acquisition unit configured to acquire position information indicating the position of the portable terminal, which is currently connected; a determination unit configured to determine, based upon the position information and position information that indicates the position of the image forming apparatus, whether the portable terminal is within a predetermined range with respect to the image forming apparatus; and a unit configured to permit local operation of the image forming apparatus from the portable terminal in a case where it has been determined that the portable terminal is within the predetermined range.

Further features of the present invention will become apparent from the following description of exemplary embodiments with reference to the attached drawings.

BRIEF DESCRIPTION OF THE DRAWINGS

FIG. 3A is a diagram illustrating the software configuration of an image forming apparatus according to the embodiment, and FIG. 3B is a diagram illustrating the software configuration of a tablet terminal;

FIGS. 4A, 4B, 4C and 4D are diagrams illustrating information managed by software;

FIGS. 5A, 5B, 5C, 5D, 5E, 5F and 5G are diagrams illustrating screens of a user interface on a control panel 212;

FIG. 6 is a diagram illustrating an operating sequence executed when user authentication is performed in this embodiment;

FIGS. 10A and 10B are diagrams illustrating screens of a user interface corresponding to the sequence of FIG. 9.

DESCRIPTION OF THE EMBODIMENTS

Embodiments of the present invention will now be described with reference to the drawings.

First Embodiment

Scene of Utilization

Figure 1:
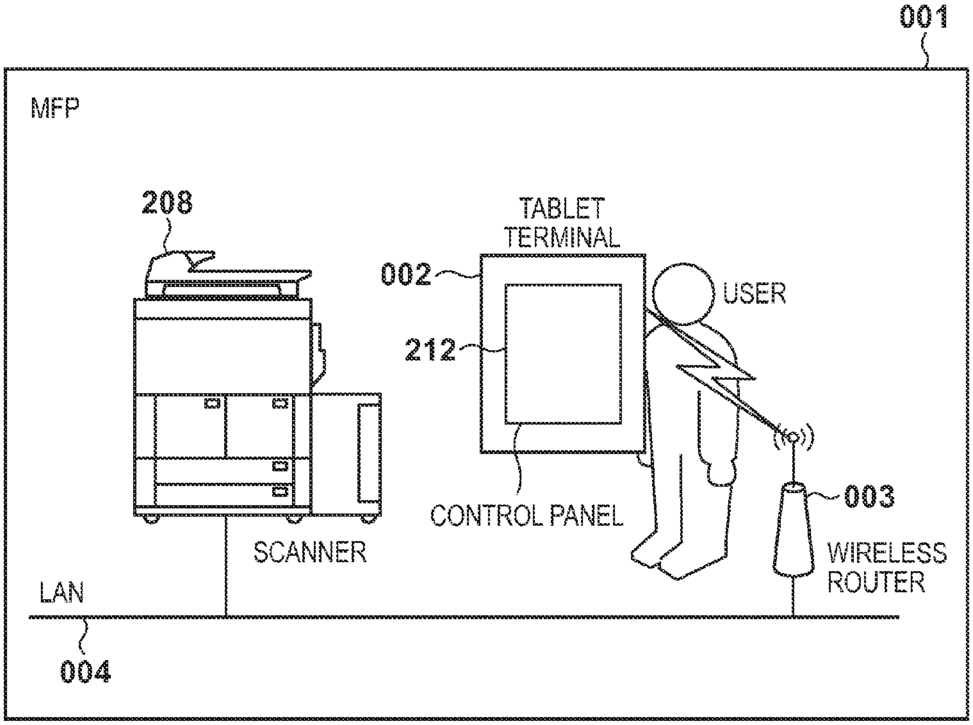
FIG. 1 is a diagram illustrating a scene in which an image forming apparatus according to an embodiment of the present invention is utilized.

FIG. 1 is a diagram illustrating a scene in which an image forming apparatus according to an embodiment of the present invention is utilized. A multifunction peripheral (MFP) 001 such as a digital copier is installed in an office and is capable of being used by multiple users. Each user who works in the office possesses his or her own tablet terminal for business use. The MFP 001 and a tablet terminal 002 are capable of being connected to each other via a wireless router 003 and LAN 004. The user utilizes the functions of the MFP 001 from a control panel 212 on the tablet terminal 002 carried about by this user. When the user utilizes an image scanner 208 of the MFP 001, the user operates the tablet terminal 002 while standing in front of the MFP 001. Although they are not illustrated in the drawings, it will be assumed that this office has multiple MFPs having the same structure as that of the MFP 001 and that multiple tablet terminals having the same structure as that of the tablet terminal 002 also exist in the office. The "tablet terminal" mentioned in this embodiment refers to a terminal that can be carried about by the user and that has a position identifying function such as GPS as well as capability and functionality for operating the MFP remotely. Even if the form of the terminal and the user interface and the like do not apply to a so-called tablet terminal, the device will fall under the category of a tablet terminal referred to in this embodiment so long as it possesses the above-mentioned functions. In this embodiment, an operation that can be specified using the control panel mounted on the MFP will be referred to as a "local operation", and a function that can be executed by a local operation will be referred to as a "local function". In this embodiment, a scanner-executed operation (scanning operation) and an MFP shutdown operation will be described as local operations. According to this embodiment, under predetermined conditions, remote operation from a terminal is regarded as a local operation, a scanning operation, which intrinsically is a local operation, is permitted and execution of the scanning function is made possible. It should be noted that a local operation is not limited to the scanning operation or shutdown operation; other executable operations may also be local operations.

<Hardware Configuration of MFP 001 in this Embodiment>

Figure 2:
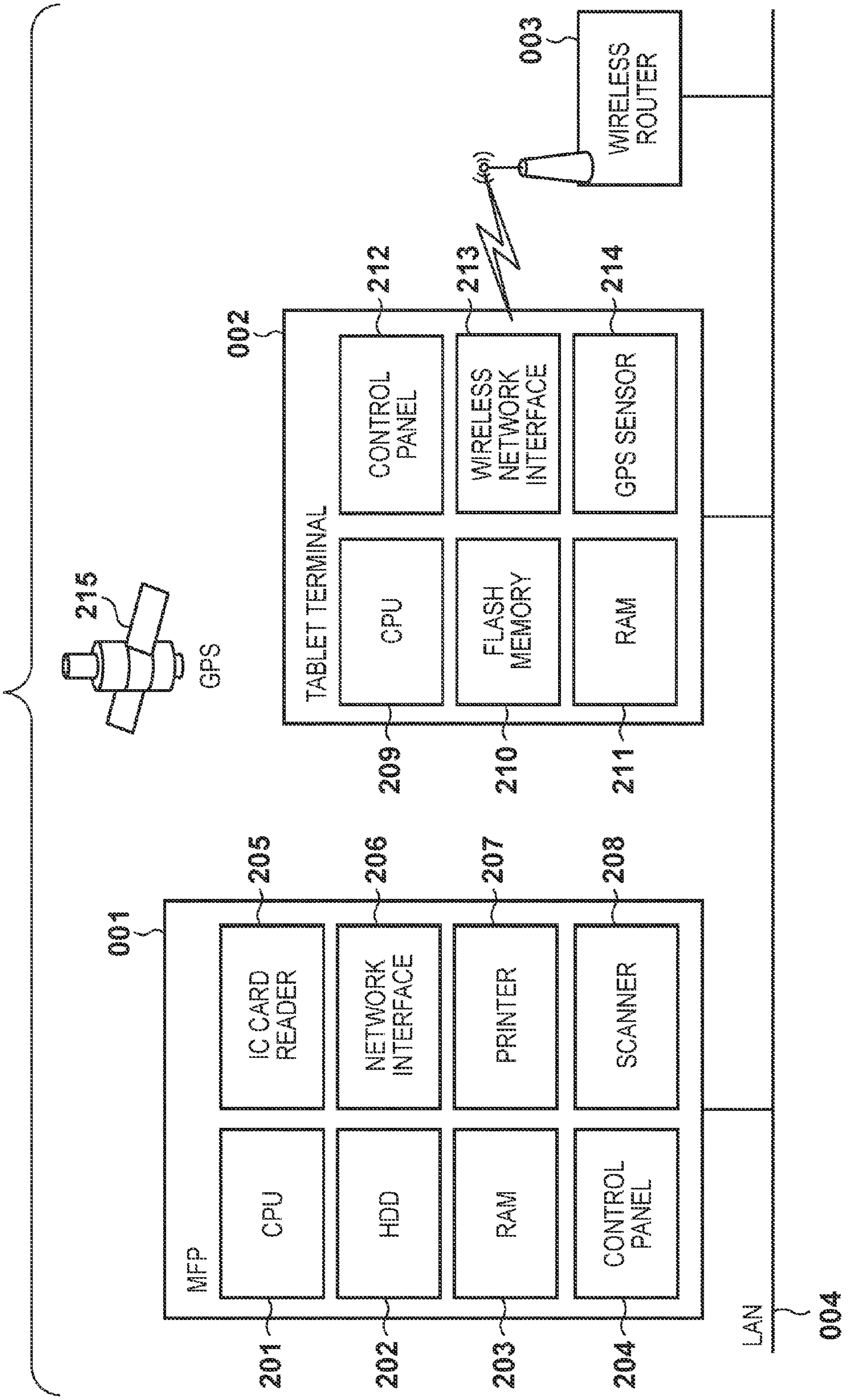
FIG. 2 is a diagram illustrating a hardware configuration according to the embodiment.

Next, reference will be had to FIG. 2 to describe the hardware configuration of this embodiment. A CPU 201 controls the overall MFP 001, and a hard-disk drive (HDD) 202 stores the software program executed by the CPU 201, as well as data. A RAM 203 is a volatile memory used as the work area of the CPU 201, as a receive buffer and for rendering images. A control panel 204 is a touch-panel-type liquid crystal panel for displaying a user interface having various switches and buttons and the like. An IC card reader 205 is for reading an IC card used for user authentication. A network interface 206 is an NIC (Network Interface Card) for connecting to a network. A printer 207 is a printer for printing on paper. A scanner 208 reads in a printed document or the like and converts it to electronic data. The items of hardware 201 to 208 are interconnected by an internal bus (not shown) and can exchange data with one another.

<Hardware Configuration of Tablet Terminal 002>

A CPU 209 controls the overall tablet terminal 002, and a flash memory 210 is a non-volatile memory for storing the software program, which is executed by the CPU 209, as well as data. A RAM 211 is used as a work area when the CPU 209 executes the software program. A control panel 212 is a touch-panel-type liquid crystal panel capable of being operated by the fingers of the user. A wireless network interface 213 is a wireless-compatible NIC capable of performing network communication upon being connected to the wireless router 003. A GPS sensor 214 receives a signal from a GSP satellite 215 and computes information indicative of the location of the tablet terminal 002. It should be noted that although the position information is computed using the GPS sensor in this embodiment, the sensor is not limited to a GPS sensor and the position information may just as well be computed using another position sensor.

<Software Configuration of MFP 001 in this Embodiment>

Next, reference will be had to FIGS. 3A and 3B to describe the software configuration of this embodiment. FIG. 3A is a block diagram illustrating the software configuration of the MFP 001. A device driver group 301 is a group of device drivers for controlling various hardware. An application platform 302 manages the launching of applications and services that operate on the MFP 001. The application platform 302 provides the following APIs with respect to applications and services:

- an API for performing exchange of data between applications and services; and
- an API for utilizing hardware functions from applications and services via the device driver group.

The application platform 302 can be constructed in a form that includes an operating system such as Linux® or the like, a JAVA® virtual machine and an OSGi frame work. JAVA® is the registered trademark of Oracle Corporation. The OSGi framework is a JAVA-based service platform defined by the OSGi Alliance (a standards organization).

A local application group 303 is a group of applications for displaying the user interface on the control panel of the MFP 001. The local application group 303 is composed of applications such as a copy application that provides a copy function and a scan application that provides a scan function. A remote application group 304 provides user interfaces, which are described in HTML, for Web browsers of the tablet terminal 002 and for a personal computer. The remote application group 304 is composed of applications such as an MFP 001 management application, which provides a function for setting the MFP 001, and a direct-print application, which provides a function for printing documents in the PDF format. A Web service group 305 provides the applications of the tablet terminal 002 and personal computer with APIs utilizable with the SOAP protocol. The Web service group 305 is composed of a group of Web services that provide a scan function, print function, a store-and-print function and a shutdown function for shutting down the MFP 001. "Store and print" refers to printing of the type in which print data received from the tablet terminal 002 or personal computer is stored temporarily on the hard-disk drive 202 of the MFP 001, after which the user operates the control panel 204 of the MFP 001 to instruct execution of printing of the temporarily stored print data. A VNC service 306 is a service that implements a protocol for operating the control panel 204 remotely. A log-in service 307 provides the following functions:

User Management Interface

The log-in service 307 provides a user interface that makes it possible to switch between user management ON and user management OFF. In a case where user management is carried out, the log-in service 307 provides a user interface for registering the account and password of the user who uses the MFP 001, as well as the ID of the IC card. The changeover between ON and OFF of the user management function is, for example, performed using the control panel of the MFP 001 or from a remote management computer by an administrator having the prescribed authorization.

Local Log-In

The log-in service 307 performs user authentication upon acquiring the ID, which has been recorded on the IC card, by the IC card reader 205. Alternatively, it can be arranged so that user authentication is performed upon acquiring the account and password entered from the control panel 204. Logging-in to the MFP 001 directly without the intermediary of the tablet terminal 002 in this manner is referred to as "local log-in". The log-in service 307 further controls access of an authenticated user to the local application group 303. It limits the number of users who can perform local log-in simultaneously to a single user. Multiple users cannot perform local log-in at the same time. Whether or not each individual user can gain access is set beforehand by the administrator, by way of example.

Remote Log-In

The log-in service 307 performs user authentication upon acquiring user authentication information (account and password) via the network. The log-in service 307 controls access of an authenticated user to the remote application group 304, Web service group 305 and VNC service 306. The log-in service 307 is adapted so as to make it possible for multiple users to perform remote log-in simultaneously.

<Software Configuration of Tablet Terminal 002>

FIG. 3B is a block diagram illustrating the software configuration of the tablet terminal 002. A device driver group 308 is a group of device drivers for controlling various hardware in the tablet terminal 002. An application platform 309 manages the launching of applications and services that run on the tablet terminal 002. The application platform 309 provides APIs such as an API by which an application utilizes the functions of the hardware via the device driver group 308, and an API for accessing data that has been stored in the flash memory 210. The application platform 309 can be implemented using a platform such as Google Inc.'s Android® or Apple Inc.'s iOS. It is possible for various applications to be installed in the tablet terminal 002 and to be run on the application platform 309. For example, it will be assumed that applications such as an MFP application 310, a Web browser 311 and a VNC client 312 are in a state usable in the tablet terminal 002. The MFP application 310 is an application for connecting to the Web service group 305 of the MFP 001 and for utilizing such functions as the printer and scanner of the MFP 001. The MFP application 310 has a user interface (refer to user interface D503 in FIG. 5C) for pre-registering the MFP that is the destination of the connection. By using the user interface D503, the name and network address of the MFP and the user authentication information (account and password) used in remote log-in can be registered. The registered data is recorded in the flash memory 210 via the application platform 309. The MFP application 310 further has a user interface (see user interface D507 in FIG. 5) for setting performing settings when the scanner is used. The user interface D507 makes it possible to set the data format after the scanning of a document, the resolution and storage destination and the transmission destination of data.

<User Authentication Information Table (FIG. 4A)>

Next, information managed and referred to by the software of the MFP and tablet terminal will be described. A user authentication information table will be described first. Tables shown in FIGS. 4A to 4C are stored and managed by the MFP, and the table of FIG. 4D is stored and managed by the tablet terminal. FIG. 4A is a user authentication information table 410 to which the log-in service 307 refers at the time of user authentication. The user authentication information table 410 includes accounts, passwords and card IDs of IC cards for use in user authentication. These items of information are recorded beforehand on the hard-disk drive 202 by the administrator of the MFP 001 via a user interface provided by the log-in service 307.

<Access Control Table (FIG. 4B)>

FIG. 4B is an access control table 420 referred by the log-in service 307. An access control table 420 represents the relationship among operation permission levels, functions for which utilization is permitted, and GPS positioning conditions used in determining permission. The GPS positioning conditions include the following items:

GPS positioning accuracy: This is GPS positioning accuracy of the GPS sensor possessed by the tablet terminal, namely measured-position accuracy information, and indicates the degree of positioning error.

Distance: This is linear distance between the MFP 001 and tablet terminal.

Height: This is the distance between the height of the MFP 001 and the height of the tablet terminal.

Positioning time: This is the time difference between the time at which the GPS sensor of the tablet terminal calculates position information and the present time.

The operation permission level takes on Levels 1, 2, 3 and 4 in order starting from the higher-order level. In this embodiment, changing to a higher-order level is referred to as "raising the level", and changing to a lower-order level is referred to as "lowering the level". The log-in service 307 compares the values of items (GPS positioning accuracy, horizontal distance from the MFP, height difference and positioning time), which are calculated from the GPS positioning information acquired from the tablet terminal and from the position information of the MFP, with the GPS positioning conditions in the access control table 420 and determines the functions the utilization of which is permitted from the tablet terminal. The determination is made based on a logical product of all items, for example. In other words, with regard to a certain level, the log-in service 307 compares the value measured for every item with the condition in the table and, if there is even one item for which the condition is not satisfied, determines that the condition of this particular operation permission level is not satisfied. The highest operation permission level among the operation permission levels that satisfy the conditions is decided upon as the operation permission level with respect to this particular log-in user. The access control table 420 is recorded on the hard-disk drive 202 when the apparatus is shipped from the factory. The administrator of the MFP may provide a user interface that is capable of changing these values. It should be noted that the horizontal distance and the height difference indicate a condition signifying that the tablet terminal (namely the user thereof) is within a predetermined range with respect to the MFP 001. The height difference is used in order to determine, for example, that the MFP and tablet terminal are on the same floor. The positioning time indicates, for example, an allowable range between the time at which the position of the tablet terminal is measured and the time at which the position information of the tablet terminal is compared with the access control table 420, and is a criterion of the freshness of the measured position information.

In the example of FIG. 4B, Level 4 is such that absolutely no operation is permitted from the tablet terminal in a case such as one where position information cannot be acquired. At Level 3, only the store-and-print operation is permitted from the tablet terminal. At Level 2, a printing operation in addition to store and print is permitted from the tablet terminal. At Level 1, local operation such as the scanning operation is further permitted from the tablet terminal.

<Position Information of MFP 001>

The log-in service 307 makes it possible to acquire position information (e.g., latitude, longitude, elevation) of the MFP 001, an example of which is shown below, from the application platform 302. These items of information are recorded beforehand on the hard-disk drive 202 by the administrator of the MFP 001 via a user interface for setting and management provided in the MFP 001. It may be arranged so that in a case where the MFP 001 is equipped with a GPS sensor, the MFP 001 calculates the position information of the MFP 001 using this GPS sensor. The example of the position information of the MFP 001 is as follows:

Latitude: N35 21'45.5148

Longitude: E138 43'52.5020

Elevation: 37 m

<Client Management Table (FIG. 4C)>

FIG. 4C is a client management table 430 indicating information concerning tablet terminals currently accessing the MFP 001. Each item in the table will now be described.

- Client ID: This is the name or identifier of a tablet terminal that the MFP has received from the tablet terminal.
- Address: This is the network address of a tablet terminal.
- Log-in account: This is the account of a user currently performing remote log-in from a tablet terminal.
- Distance: This is the distance to the MFP calculated based upon position information acquired from a tablet terminal.
- Permission level: This represents the functions, for which utilization is permitted, already posted to the tablet terminal.
- Local-operation reservation status: This represents absence or presence of reservation of local operation from a tablet terminal.

These items of information are recorded in a RAM and managed in order that the log-in service 307 may manage tablet terminals currently accessing the MFP 001. During the time the MFP is being accessed from a tablet terminal, the log-in service 307 updates the information as necessary in accordance with any change in status. For example, it will suffice for the client ID and address and log-in account to be updated whenever the user logs-in and logs-out from the tablet terminal, and it will suffice if the local-operation reservation status is updated in accordance with operation. Information related to the stated position information of distance and permission level can be updated by, for example, acquiring the position information prevailing at such time that a tablet terminal requests the position information and then transmitting this position information from the tablet terminal to the MFP.

<MFP Registration Table (FIG. 4D)>

An MFP registration table 440 is a table for registering connection-destination MFPs managed by the MFP application 310 of tablet terminal 002. The MFP registration table 440 has been stored by the tablet terminal. Recorded in the MFP registration table 440 are such items as the names of connection-destination MFPs, the network addresses of the MFPs, and user authentication information (account and password) used for remote log-in. These items of information are recorded in the flash memory 210 and managed via the user interface of the MFP application 310.

<Operation for Utilizing Functions of MFP 001 from Tablet Terminal 002>

Next, operation performed when the user utilizes the functions of the MFP 001 from the tablet terminal 002 will be described.

<Operation for Utilizing Functions of MFP 001 from Tablet Terminal 002 (User Management Function ON>

Reference will be had to the sequence diagram of FIG. 6 to describe operation in a case where the user management function of the log-in service 307 is ON. The tablet terminal 002 displays icons (S601), which are for selecting applications possessed by the tablet terminal 002, on an initial display (D501 in FIG. 5A). Upon sensing depression (S602) of an icon B508 (FIG. 5A) of the MFP application 310, the tablet terminal 002 launches the MFP application 310. The launched MFP application 310 reads out the MFP registration table 440 and displays a screen (D502 in FIG. 5B) for selecting the MFP to which the tablet terminal is to be connected (S603). If the user selects the MFP 001, the MFP application 310 transmits the information concerning the tablet terminal 002 via the LAN 004 and connects to the MFP 001 (S605). The log-in service 307 of the MFP 001 receives user authentication information from the tablet terminal 002 (S606), refers to the user authentication information table 410 and performs user authentication (S607). If user authentication succeeds, the log-in service 307 correlates the authenticated account and the information of the tablet terminal 002 currently connected and records these in the client management table 430. Upon receiving notification of successful authentication from the MFP 001 (S608), the MFP application 310 queries the MFP 001 about functions capable of being utilized by the MFP application 310 (S609). Upon receiving the query, the log-in service 307 requests the tablet terminal 002 for transmission of position information (S610). The MFP application 310 acquires GPS positioning accuracy and GPS positioning information (longitude, latitude, height, measurement time) from the GPS sensor 214 via the application platform 309 and transmits these to the MFP 001 (S611). Upon receiving this information from the tablet terminal 002, the log-in service 307 compares the information with the access control table 420 and decides the permission level with regard to the tablet terminal 002 (S612). The log-in service 307 checks to determine whether another user is currently utilizing local operation (S613). If another user has already performed local log-in or if another terminal is being notified of permission for local operation, then the log-in service 307 determines that utilization of local operation is in progress. In such case processing is changed, as set forth below, based upon the local-operation utilization status and permission level.

<If Another User is Currently Utilizing Local Operation>

In this case, the level is lowered to Level 2 or lower even if the operation permission level is found to be Level 1 at S612. Although local operation from the tablet terminal 002 is not permitted, it is made possible for a user to reserve local operation.

<If the Same User has Already Performed Local Log-In>

In this case, it is judged that the user operating the tablet terminal 002 is right in front of the MFP 001 and, hence, the permission level for the tablet terminal 002 is raised to Level 1.

<If Utilization of Local Operation is not in Progress and the Permission Level is Level 2, 3 or 4>

If, on the other hand, it is judged that utilization of local operation is not in progress and, moreover, the current permission level is Level 2, 3 or 4, then a sequence from S614 to S618 is executed. At S614, the MFP transmits a message that prompts the user operating the tablet terminal 002 to perform local log-in. Upon receiving this message, the MFP application 310 displays screen D504 (FIG. 5D) (S615). When the IC card is read as by being held up to an IC card reader (S616), the log-in service 307 refers to the user authentication information table 410 and performs user authentication (S617). If user authentication succeeds, it is determined whether the account authenticated at S617 and the account authenticated at S607 are the same (S618). If they are the same, it is determined that the user using the tablet terminal 002 is near the MFP 001, e.g., right in front of the MFP 001, and the operation permission level for the tablet terminal 002 is raised to Level 1. Raising of the operation permission level is not carried out if the user authentication operation is not performed for a fixed period of time or if it is sensed that the user has pressed a cancel button B509 on screen D504 (FIG. 5D).

Figure 5G:
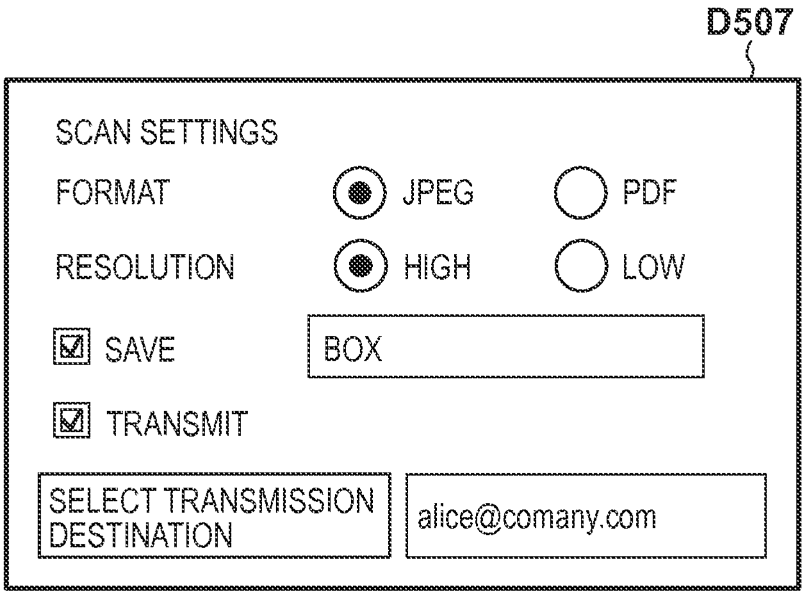

On the basis of the decisions rendered at S612, S613 and S618, the log-in service 307 finally determines the operation permission level for the tablet terminal 002 and whether operation of the MFP has been reserved and notifies the tablet terminal 002 of the functions of the MFP capable of being utilized and of the functions capable of being reserved (S619). Based upon the information received from the MFP 001, the MFP application 310 displays a screen D505 (FIG. 5E) or D506 (FIG. 5F) (S620). For example, if local operation is not permitted, then, as indicated on user interface D505, a scan execute button (B510 in FIGS. 5E and 5F) and an MFP 001 shutdown button (B511 in FIGS. 5E and 5F) are grayed out. Thus, it is arranged so that even if local operation is not permitted, an operation for setting up scanning (D507 in FIG. 5G) can be carried out. If it is possible to reserve local operation, a local operation reservation button (B512 in FIG. 5E) is displayed. If local operation is possible, the scan execute button (B510) and the shutdown button (B511) are activated, as indicated on user interface D506 (FIG. 5F). When the MFP application 310 senses depression (S621) of the scan execute button (B510 in FIGS. 5E and 5F), it transmits a scan execution request, together with the scan settings, to the Web service of the MFP 001 (S622). The Web service of the MFP 001 that has received these items operates the scanner 208 of the MFP 001 and executes scanning (S623). Upon sensing the end of scanning, the Web service notifies the tablet terminal 002 of completion of scanning (S624). When utilization of the MFP application 310 is quit (S625), the tablet terminal 002 notifies the MFP 001 of end of utilization (S626) and severs the connection. Upon sensing end of utilization, the MFP 001 executes processing for logging-out the user who logged-in at S607 and discards the information concerning the tablet terminal 002 that has been recorded in the client management table 430 (S627).

Figures 7, 8:
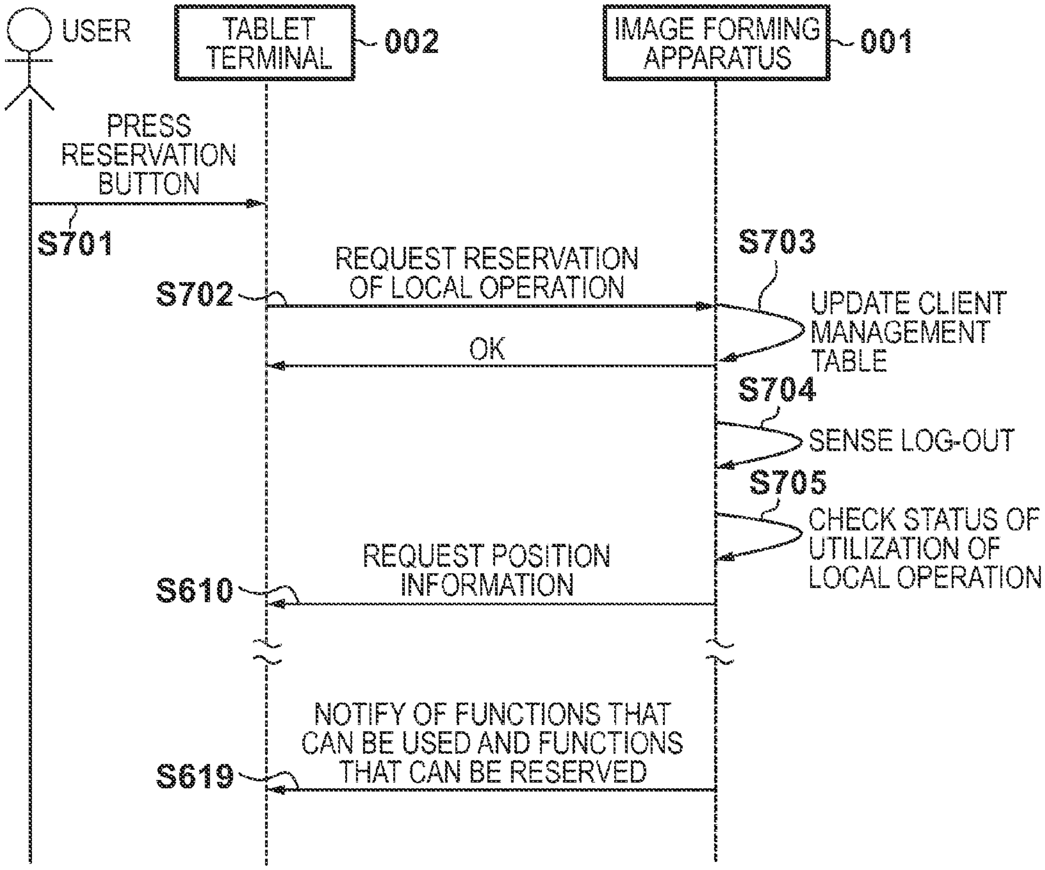
FIG. 7 is a diagram illustrating an operating sequence executed when local operation is reserved in this embodiment.
FIG. 8 is a diagram illustrating a client-password management table.

Next, reference will be had to the sequence diagram of FIG. 7 to describe operation in a case where notification that local operation can be reserved has been given at S619, the local operation reservation button B512 has been pressed in response to this notification and local operation has been reserved from the MFP application 310. Upon sensing (S701) depression of the local operation reservation button (B512) on the screen D505 (FIG. 5E), the MFP application 310 sends the MFP 001 a request to reserve local operation (S702). Upon receiving the request for reservation of local operation, the log-in service 307 of MFP 001 updates the local-operation reservation status of the client management table 430 to "RESERVATION RECEIVED" (S703). When the log-in service 307 senses log-out from local log-in or remote log-in (S704), it checks the status of utilization of local operation (S705). If it can be verified at S705 that there is no user who is currently performing local log-in and that there is no tablet terminal that has been permitted local operation, then the log-in service 307 requests transmission of position information from the tablet terminal 002 that has reserved local operation (S610). By subsequently executing processing similar to that of the processing of S610 to S618 described above, the log-in service 307 determines the utilization permission level of the tablet terminal 002. Following this determination, the tablet terminal 002 is again notified of the functions it can utilize and of the functions that can be reserved (S619).

<Operation for Utilizing Functions of MFP 001 from Tablet Terminal 002 (User Management Function OFF>

If the user management function is OFF, the log-in service 307 does not execute user authentication but it does implement an access control function that conforms to the location of the tablet terminal 002. Reference will be had to the sequence diagram of FIG. 9 to describe operation in a case where the user management function of the log-in service 307 is OFF. Process steps in FIG. 9 identical with those shown in FIG. 6 are indicated by like reference characters and need not be described again.

Upon sensing connection from the tablet terminal 002 (S605), the log-in service 307 correlates the information concerning the tablet terminal 002 and records the correlated information in the client management table 430. Since user authentication is not carried out, log-in account information of the client management table 430 is not recorded. The log-in service 307 requests the tablet terminal 002 for transmission of its position information (S610), compares the acquired information with the access control table 420 and decides the permission level regarding the tablet terminal 002 (S612). In a case where the permission level is Level 2, 3 or 4, the log-in service 307 issues a one-time password for the tablet terminal 002 (S901). Next, the log-in service 307 notifies the user operating the tablet terminal 002 of the issued one-time password and sends the user a message prompting an input of the password to the control panel of the MFP 001 (S902). Upon receiving the message, the MFP application 310 displays a screen D1001 shown in FIG. 10A (S903). Meanwhile, the log-in service 307 displays a screen D1002 (FIG. 10B), which is for inputting the password, on the control panel of the MFP 001 (S903). The log-in service 307 acquires the password that the user has entered on the screen D1002 (S904), compares this with the password that was issued at S901 and checks for a match between the passwords (S905). If the passwords match, the log-in service 307 judges that the user carrying the tablet terminal 002 in near the MFP 001, e.g., right in front of the MFP 001, and raises the permission level of the tablet terminal 002 to Level 1. Raising of the permission level is not carried out if there is no input of the password for a fixed period of time or if it is sensed that the user has pressed a cancel button on the screen D1001 or D1002. The log-in service 307 notifies the tablet terminal 002 of the functions capable of being used at the permission level determined (S906).

Rather than issuing a one-time password at S901, an arrangement may be adopted in which a client password management table of the kind shown in FIG. 8 is pre-registered on the hard-disk drive 202 and managed by the log-in service 307. The log-in service 307 correlates and manages the tablet terminal 002 and password using the client password management table. The administrator of the MFP 001 or owner of the tablet terminal 002 pre-registers the password in the client password management table via the user information provided by the log-in service 307. The user using the MFP 001 need not notify the tablet terminal 002 of the password at S902 on the assumption that the already registered password is known beforehand. At S905, the log-in service 307 compares the password that the user has entered on the screen D1002 with the already registered password and checks for a match between the passwords.

By implementing the arrangement described in the first embodiment set forth above, a scanner function, which is intrinsically a local function, can be executed from a mobile portable terminal, even by remote operation from the terminal, under the condition that the terminal is in the vicinity of an MFP (namely an image forming apparatus). As a result, a pull scan from a portable terminal (a scanning function in which the terminal takes the initiative in implementing the function) becomes possible upon eliminating the problems encountered in the prior art. That is, since the arrangement is such that local operation of the image forming apparatus cannot be performed by a user who is far from the image forming apparatus, a user who is performing local operation at the image forming apparatus will not have such operation impeded by the terminal of another user. Further, since it is arranged so that the image forming apparatus acquires the position information of a terminal such as a tablet terminal from the terminal via a wireless LAN, it is not required that the image forming apparatus have a device for short-distance communication, such as an infrared device or Bluetooth® device. Further, since it is arranged so that a scanner function based upon operation from the tablet terminal is made usable only near the image forming apparatus, it is possible to reduce the likelihood that a scanned document will be left on the scanner after execution of the scan. Furthermore, in a case where the tablet terminal is equipped with highly accurate GPS, it is unnecessary for an authentication operation to be performed at the image forming apparatus. The result is user operation that is not troublesome. Further, in a case where the tablet terminal is not equipped with highly accurate GPS, permission for local operation from the terminal can be obtained by having the user perform a user authentication operation at the image forming apparatus.

The effects set forth below are also obtained as secondary effects of the present invention.

- It is arranged so that it is possible for a user to reserve operation even if another user is already in the process of performing a local operation. This means that a user need not wait in front of the image forming apparatus until another user has finished using the apparatus.
- It is arranged so that a function other than local operation can be utilized even without the user being in the vicinity of the image forming apparatus. The user can, therefore, select the place of utilization in accordance with the purpose for which the image forming apparatus is being utilized.

Second Embodiment

In the first embodiment, an example is illustrated in which permission for local operation of the MFP 001 is granted to the MFP application 310 of the tablet terminal 002. However, it is possible for the present invention to be utilized also in access control when permission for local operation of the MFP 001 is granted not only with respect to access from the MFP application 310 but also access from a Web browser or VNC client. Examples of such arrangements are described below.

<Access from Web Browser>

It is arranged so that it is possible for the log-in service 307 to execute communication processing (S605 to S619), which is similar to that of the MFP application 310, using the Web browser of the tablet terminal 002 and the HTTP protocol. The log-in service 307 determines the permission level through the processing of S605 to S618 and notifies the remote application group of the permission level. Control is possible in which the remote application group sends the Web browser a user interface, which is expressed in HTML, in such a manner that only the functions permitted by the permission level are capable of being executed.

<Access from VNC Client>

It is arranged so that when the VNC client accesses the VNC service, it is possible for the VNC client to execute communication processing (S605 to S619 similar to that of the MFP application 310. It is arranged so that the log-in service 307 determines the permission level through the processing of S605 to S618 and permits a connection between the VNC client and the VNC service only in a case where utilization of local operation is permitted.

By adopting the arrangements set forth above, it is possible for the present invention to be utilized also in access control when permission for local operation of the MFP 001 is granted with respect to access from a Web browser or VNC client.

Third Embodiment

Figure 9:
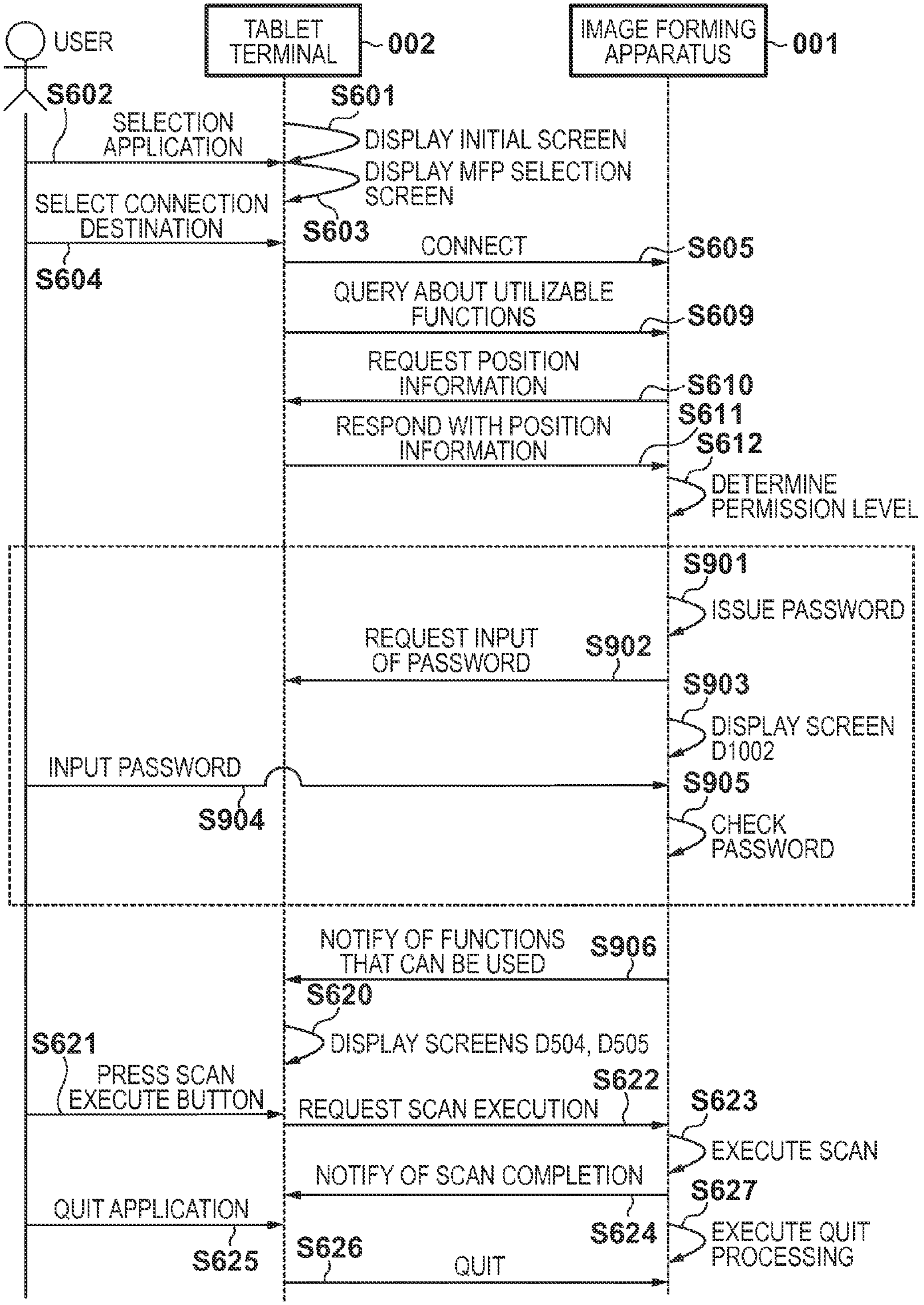
FIG. 9 is a diagram illustrating an operating sequence executed when user authentication is not performed in this embodiment.

In the foregoing embodiments, the image forming apparatus requests the tablet terminal for position information and, if no position information is obtained, it is judged, through the steps of S614 to S618 in FIG. 6 or S901 to S905 in FIG. 9, that the operator of the terminal is operating the image forming apparatus as well, namely that the operator is near the image forming apparatus.

In this embodiment, S614 of FIG. 6 or S901 of FIG. 9 is executed without requesting the tablet terminal for position information, namely without executing steps S610 to S612 of FIG. 9 (and S613 of FIG. 6).

By adopting such an arrangement, needless communication traffic can be reduced in a case where use is made to a terminal not having a function for acquiring position information.

The effects set forth below are obtained by the foregoing embodiments.

- It is possible to operate an image forming apparatus from a terminal.
- Since it is arranged so that local operation of an image forming apparatus cannot be performed by a user who is far from the image forming apparatus, a user who is performing local operation at the image forming apparatus will not have such operation impeded by the terminal of another user.
- Since it is arranged so that an image forming apparatus acquires the position information of a terminal such as a tablet terminal from the terminal via a wireless LAN, it is not required that the image forming apparatus have a device for short-distance communication, such as an infrared device or Bluetooth® device.
- Since it is arranged so that scanner operation is possible only from a terminal only in the vicinity of an image forming apparatus, it is possible to reduce the likelihood that a document used in scanning will be left on the scanner after execution of the scan.
- In a case where a tablet terminal is equipped with highly accurate GPS, it is unnecessary for an authentication operation to be performed at the image forming apparatus. The result is user operation that is not troublesome.
- In a case where a tablet terminal is not equipped with highly accurate GPS, permission for local operation from the terminal can be obtained by having the user perform a user authentication operation at the image forming apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-044306, filed Feb. 29, 2012, which is hereby incorporated by reference herein in its entirety.

What is claimed is:

1. An image forming apparatus capable of being connected to a portable terminal via a network, comprising:

an acquisition unit configured to acquire position information indicating the position of the portable terminal, which is currently connected;

a determination unit configured to determine, based upon the position information and position information that indicates the position of the image forming apparatus, whether the portable terminal is within a predetermined range with respect to the image forming apparatus;

a unit configured to permit local operation of the image forming apparatus from the portable terminal in a case where it has been determined that the portable terminal is within the predetermined range;

a remote log-in unit configured to log-in to the image forming apparatus from the portable terminal; and a local log-in unit configured to log-in to the image forming apparatus directly;

wherein even in a case where it has been determined by the determination unit that the portable terminal is not within the predetermined range with respect to the image forming apparatus, local operation of the image forming apparatus is permitted from the portable terminal if it is determined that a user who has been logged-in by the remote log-in unit is the same user as a user currently logged in by the local log-in unit.

2. The apparatus according to claim 1, further comprising a unit configured to accept reservation of local operation from the portable terminal if it is determined that a user who has been logged-in by the remote log-in unit is different from a user currently logged-in by the local log-in unit;

wherein local operation of the image forming apparatus is permitted from the portable terminal, which has reserved local operation, after log-out of the user logged-in by the local log-in unit is sensed.

3. The apparatus according to claim 1, further comprising:

a unit configured to issue a one-time password;

a unit configured to notify the portable terminal, which is currently connected, of the one-time password; and a unit configured to allow a user to input the one-time password to the image forming apparatus; and a unit configured to permit local operation of the image forming apparatus from the portable terminal in a case where these one-time passwords match.

4. The apparatus according to claim 1, wherein the acquisition unit further acquires accuracy information, which indicates accuracy of the position information, together with the position information; and the determination unit determines that the portable terminal is within the predetermined range with respect to the image forming apparatus on the condition that the accuracy of position indicated by the accuracy information is a predetermined accuracy, and determines that the portable terminal is not within the predetermined range with respect to the image forming apparatus if the position information or accuracy information cannot be acquired or if the accuracy information does not have the predetermined accuracy.

5. The apparatus according to claim 1, wherein local operation includes scanning of an image by an image scanner possessed by the image forming apparatus.

6. The apparatus according to claim 1, wherein even in a case where the portable terminal is not permitted to perform the local operation, a print operation from the portable terminal and a store-and-print operation from the portable terminal are permitted in accordance with distance between the portable terminal and the image forming apparatus.

7. A method of controlling an image forming apparatus capable of being connected to a portable terminal via a network, comprising:

acquiring position information indicating the position of the portable terminal, which is currently connected;

determining, based upon the position information and position information that indicates the position of the image forming apparatus, whether the portable terminal is within a predetermined range with respect to the image forming apparatus;

permitting local operation of the image forming apparatus from the portable terminal in a case where it has been determined that the portable terminal is within the predetermined range;

logging in, by a remote log-in unit, to the image forming apparatus from the portable terminal; and logging in, by a local log-in unit, to the image forming apparatus directly;

wherein even in a case where it has been determined that the portable terminal is not within the predetermined range with respect to the image forming apparatus, local operation of the image forming apparatus is permitted from the portable terminal if it is determined that a user who has been logged-in by the remote log-in unit is the same user as a user currently logged in by the local log-in unit.

8. A non-transitory computer-readable medium storing a program, which is executed by an image forming apparatus capable of being connected to a portable terminal via a network, for implementing a method of controlling the image forming apparatus, the method comprising:

acquiring position information indicating the position of the portable terminal, which is currently connected;

determining, based upon the position information and position information that indicates the position of the image forming apparatus, whether the portable terminal is within a predetermined range with respect to the image forming apparatus;

permitting local operation of the image forming apparatus from the portable terminal in a case where it has been determined that the portable terminal is within the predetermined range;

logging in, by a remote log-in unit, to the image forming apparatus from the portable terminal; and logging in, by a local log-in unit, to the image forming apparatus directly;

wherein even in a case where it has been determined that the portable terminal is not within the predetermined range with respect to the image forming apparatus, local operation of the image forming apparatus is permitted from the portable terminal if it is determined that a user who has been logged-in by the remote log-in unit is the same user as a user currently logged in by the local log-in unit.

* * * * *